US010194696B2

(12) United States Patent
Matischek et al.

(10) Patent No.: US 10,194,696 B2
(45) Date of Patent: Feb. 5, 2019

(54) ELECTRONIC CIGARETTE, LIQUID CONTAINER, AND METHOD OF OPERATING AN ELECTRONIC CIGARETTE

(71) Applicant: Infineon Technologies AG, Neubiberg (DE)

(72) Inventors: Rainer Matischek, Graz (AT); Christoph Steffan, Graz (AT); Johannes Schweighofer, Graz (AT)

(73) Assignee: Infineon Technologies AG, Neubiberg (DE)

(*) Notice: Subject to any disclaimer, the term of this patent is extended or adjusted under 35 U.S.C. 154(b) by 0 days.

(21) Appl. No.: 15/215,661

(22) Filed: Jul. 21, 2016

(65) Prior Publication Data

US 2018/0020720 A1    Jan. 25, 2018

(51) Int. Cl.
| | | |
|---|---|---|
| *A24F 47/00* | (2006.01) | |
| *H04B 5/00* | (2006.01) | |
| *G06F 21/60* | (2013.01) | |
| *H05B 1/02* | (2006.01) | |
| *H05B 3/44* | (2006.01) | |
| *H04W 4/80* | (2018.01) | |

(52) U.S. Cl.
CPC .......... *A24F 47/008* (2013.01); *G06F 21/602* (2013.01); *H04B 5/0012* (2013.01); *H04B 5/0075* (2013.01); *H04W 4/80* (2018.02); *H05B 1/0297* (2013.01); *H05B 3/44* (2013.01); *B65D 2203/10* (2013.01)

(58) Field of Classification Search
CPC ..... A24F 47/008; A61M 11/042; A61M 15/06
See application file for complete search history.

(56) References Cited

U.S. PATENT DOCUMENTS

| | | | |
|---|---|---|---|
| 2010/0054305 A1* | 3/2010 | Hammerschmidt | G01G 19/4142 375/130 |
| 2013/0220315 A1* | 8/2013 | Conley | A24F 47/008 128/202.21 |
| 2015/0181945 A1* | 7/2015 | Tremblay | A24F 47/008 131/328 |
| 2015/0196057 A1* | 7/2015 | Wu | A24F 47/008 131/329 |
| 2016/0331035 A1* | 11/2016 | Cameron | F01K 5/00 |

(Continued)

OTHER PUBLICATIONS

Euromonitor International, "Euromonitor Research: Vapour Devices and e-Cigarettes in the Global Tobacco Market", Jun. 22, 2015, (http://blog.euromonitor.com/2015/06/vapor-devices-and-e-cigarettes-in-the-global-tobacco-market.html).

(Continued)

*Primary Examiner* — Tulsidas C Patel
*Assistant Examiner* — Marcus Harcum
(74) *Attorney, Agent, or Firm* — Viering, Jentschura & Partner MBB

(57) ABSTRACT

According to various embodiments, an electronic cigarette may be provided including a heater configured to vaporize a liquid; a mouth piece to deliver the vaporized liquid to a user of the electronic cigarette; a processor configured to control the heater to vaporize the liquid; a wireless communication circuit configured to communicate with an external communication device; and a verification circuit configured to start the operation of the electronic cigarette upon receipt of a signal transmitted by the external communication device via the wireless communication circuit.

20 Claims, 7 Drawing Sheets

(56) References Cited

U.S. PATENT DOCUMENTS

2017/0012355 A1* 1/2017 Pachler ................ H04B 5/0081
2017/0135411 A1* 5/2017 Cameron .............. A24F 47/008

OTHER PUBLICATIONS

Alexandra Sifferlin, "It's Really Easy for Teens to Buy E-Cigs Online", Time Inc., Mar. 2, 2015, (http://time.com/3725939/teens-buy-ecigarettes-online/).
Chris Morran, "Tobacco Companies Criticized for Lax Age-Verification on E-Cigarette Websites", Consumerist, Mar. 7, 2016, (https://consumerist.com/2016/03/07/tobacco-companies-criticized-for-lax-age-verification-on-e-cigarette-websites/).
Stanton Glantz, PhD, "FDA to kids: Not 18? No problem! Buy your e-cigs (and cigars and other tobacco products) online!", Center for Tobacco Control Research and Education, May 14, 2014, (https://tobacco.ucsf.edu/fda-kids-not-18-no-problem-buy-your-e-cigs-and-cigars-and-other-tobacco-products-online).

* cited by examiner

ELECTRONIC CIGARETTE, LIQUID CONTAINER, AND METHOD OF OPERATING AN ELECTRONIC CIGARETTE

TECHNICAL FIELD

Various embodiments relate generally to an electronic cigarette, a liquid container, and a method of operating an electronic cigarette.

BACKGROUND

Electronic cigarettes become more and more popular during the last decade. An electronic cigarette may be also referred to as e-cigarette, e-cig, EC, electronic nicotine delivery system (abbreviated for example with ENDS) or electronic non-nicotine delivery system (abbreviated for example with ENNDS), personal vaporizer, PV, and the like. An electronic cigarette is an electronic device that vaporizes a correspondingly suitable liquid. The vaporized liquid (e.g. also referred to as vapor) can be inhaled by the user of the electronic cigarette. The liquid to be vaporized by the e-cigarette may be also referred to as e-liquid, and may or may not include nicotine. The liquid may include propylene glycol, glycerin, and/or similar organic liquids. Further, the liquid may include flavorings. The vapor can be produced by heating the liquid substantially to its boiling point. The heating of the liquid can be activated and controlled by the user of the electronic cigarette, e.g. by pushing a button at the electronic cigarette thereby activating a heater structure of the electronic cigarette. The heater structure may be powered via a battery of the electronic cigarette. The liquid may be provided within a liquid container that can be removably inserted into or removably coupled with the electronic cigarette.

SUMMARY

According to various embodiments, an electronic cigarette may be provided including a heater configured to vaporize a liquid; a mouth piece to deliver the vaporized liquid to a user of the electronic cigarette; a processor configured to control the heater to vaporize the liquid; a wireless communication circuit configured to communicate with an external communication device; and a verification circuit configured to start the operation of the electronic cigarette upon receipt of a signal transmitted by the external communication device via the wireless communication circuit.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

Figure 1:
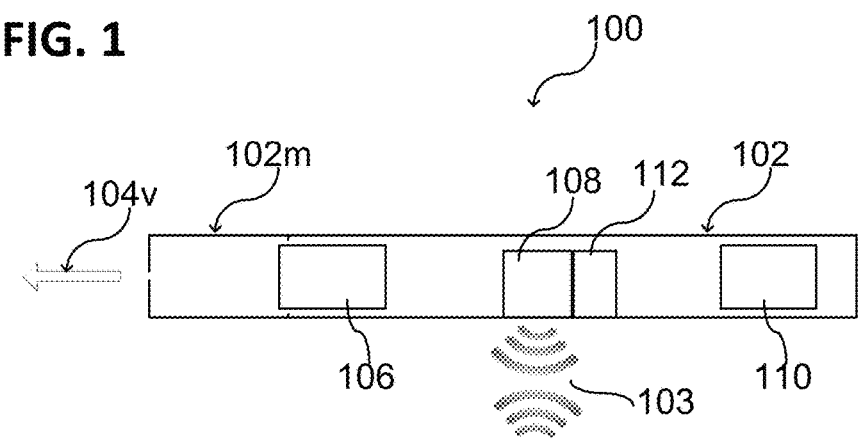
FIG. 1 shows an electronic cigarette in a schematic view, according to various embodiments.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The word "over" used with regards to a deposited material formed "over" a side or surface, may be used herein to mean that the deposited material may be formed "directly on", e.g. in direct contact with, the implied side or surface. The word "over" used with regards to a deposited material formed "over" a side or surface, may be used herein to mean that the deposited material may be formed "indirectly on" the implied side or surface with one or more additional layers being arranged between the implied side or surface and the deposited material.

The terms "at least one" and "one or more" may be understood to include any integer number greater than or equal to one, i.e. one, two, three, four, [ . . . ], etc. The term "a plurality" may be understood to include any integer number greater than or equal to two, i.e. two, three, four, five, [ . . . ], etc.

The phrase "at least one of [ . . . ] and [ . . . ]" in regard to a group of elements may be used herein to mean at least one element from the group consisting of the elements. For example, the phrase "at least one of [ . . . ] and [ . . . ]" in regard to a group of elements may be used herein to mean a selection of: one of the listed elements, a plurality of one of the listed elements, a plurality of individual listed elements, or a plurality of a multiple of listed elements. The phrase "at least one of [ . . . ] and [ . . . ]" may be used as a logical "and/or".

The term "circuit" used with regards to a wireless communication "circuit", a verification "circuit" and/or control "circuit", may be used herein to mean any kind of logic-implementing entity, which may include special-purpose hardware or a processor executing software. A circuit may thus be an analog circuit, digital circuit, mixed-signal circuit, logic circuit, processor, microprocessor, Central Processing Unit (CPU), Field Programmable Gate Array (FPGA), integrated circuit, Application Specific Integrated Circuit (ASIC), etc., or any combination thereof. Any other kind of implementation of the respective functions which will be described below in further detail may also be understood as a "circuit". It is understood that any two (or more) of the circuits, as described herein, may be realized as a single circuit with substantially equivalent functionality, and conversely that any single circuit, as described herein, may be realized as two (or more) separate circuits with substantially equivalent functionality. Furthermore, a processor or a microcontroller (or any other suitable electronic device) may include one or more circuits configured to respectively perform the desired operations, as described herein. Additionally, references to a "circuit" may refer to two or more circuits that collectively form a single circuit. The term "circuit arrangement" used herein may refer to one or more circuits and/or to an electronic device composed of one or more circuits. Furthermore, while a "circuit" may be depicted as separate from one or more other components (such as in the drawings), it is understood that the "circuit" may be integrated within another component, such as on a common integrated chip, processor, and the like.

The term "memory" may be used herein to mean a non-transitory computer-readable medium in which data or information can be stored for retrieval. The term "memory" may thus be understood as referring to volatile or non-volatile memory, including random access memory (RAM), read-only memory (ROM), flash memory, solid-state storage, magnetic tape, hard disk drive, optical drive, etc., or any combination thereof.

The term "transmit" (or send) used with regards to "transmit" a signal may be used herein to mean a both direct (point-to-point) and indirect transmission (via one or more intermediary points). Similarly, the term "receive" used with regards to "receive" a signal may be used herein to mean a both direct and indirect reception. The term "communicate" may be used herein to mean one or both of transmitting and receiving, i.e. unidirectional or bidirectional communication in one or both of the incoming and outgoing directions. The term "wireless communication" may be used herein to mean that transmitting and/or receiving is at least partially based on a data transfer between two or more points that are not connected by an electrical conductor, e.g. via electromagnetic waves such as radio waves or light.

Electronic cigarettes (also referred to as e-cigarettes or e-cigs) are massively coming into the market partly replacing the conventional cigarettes. In most countries, theoretically the use of electronic cigarettes is only allowed for people with an age over 16 or 18 years. Today, only the purchasing of electronic cigarettes may be protected by age-checks. In Austria and Germany, for example, the conventional cigarette vending machine may check the purchase via an electronic cash (EC) card. Correspondingly, the purchase of electronic cigarettes and liquid containers for electronic cigarettes may be more or less protected, e.g. in online-shops and with manual checks in offline-shops. However, currently available age-checks may be easily tricked. Therefore, it may be too easy for kids and/or adolescents to purchase such new electronic cigarettes and liquid containers for electronic cigarettes (this issue has been recently investigated and reported in broadsheet newspapers); and if one purchase way or source may be closed, always other purchase ways and sources may be found again (e.g. to purchase it indirectly).

According to various embodiments, an electronic cigarette may be provided that is configured to provide an age-check of the respective user of the electronic cigarette or, alternatively, check other security information regarding the electronic cigarette and/or the liquid. For example, the origin and distribution channels of the electronic cigarette may be checked, the quality of the liquid may be checked, product piracy may be prevented, the compatibility of the liquid container with the electronic cigarette may be checked, and the like. Therefore, the electronic cigarette and/or the corresponding liquid container may include a verification circuit and a (e.g. wireless) communication circuit configured to perform for example the operations regarding the abovementioned desired functions, e.g. age-verification.

Since today, the vast majority of people already have electronic cash (EC) cards or credit cards with Near-Field-Communication-(NFC)-functionality, NFC-capable smartphones, and/or other NFC-capable devices, and/or smartphones with other low-power wireless communication capabilities such as Bluetooth, a communication between an electronic cigarette and/or a liquid container and the user's device may be provided, according to various embodiments, to perform for example the operations regarding the above-mentioned desired functions. Therefore, already available infrastructure may be utilized for performing, for example, an age-check of a respective user of an electronic cigarette.

According to various embodiments, an electronic cigarette may be provided that is configured to check an age of a potential smoker (in other words user) right before lighting (in other words starting operation of) the electronic cigarette with the help of for example miniaturized low-power NFC technology integrated into the electronic cigarette and shortly tapping an NFC-capable banking card or an NFC-capable smartphone to the electronic cigarette for a few seconds. In analogy, other wireless communication methods may be utilized in a similar way as described herein for the NFC-communication such as Bluetooth or comparable short-medium distance wireless techniques, and may or may not use a confirmation dialog or button at the smartphone for interaction (alternatively to tapping the smartphone to the electronic cigarette).

The Near-field communication (NFC) may include a set of communication protocols that enable two electronic devices to establish communication by bringing them near to each other, e.g. within a distance less than about 10 cm, e.g. less than about 5 cm. According to various embodiments, an electronic cigarette may be one of the two devices and, for example, a portable device such as a smartphone or any other suitable device, e.g. a notebook, a bank card, a passport, and the like, may be the other one of the two devices communicating with each other to perform, for example, an age verification before starting operation of the electronic cigarette.

According to various embodiments, a system is provided that includes an electronic cigarette and an active low-power NFC-reader chip (or an alternative active wireless communication device, e.g. a Bluetooth chip) and may include a separate secure element, or alternatively, an electronic cigarette and a passive NFC-chip including a secure element in order to perform an offline age-check. The electronic cigarette may already have integrated electronics and a battery anyway to be operated based on the result of an age-check.

Illustratively, the electronic cigarette provided herein according to various embodiments may allow to check the age of a potential user of the electronic cigarette each time before "lighting" (i.e. starting operation of) the electronic cigarette. Therefore, a system is provided, according to various embodiments, combining an electronic cigarette with additional active NFC-circuits or passive NFC-circuits (and optionally a security controller) and an EC-card, smartphone, and the like.

Additionally to an age-check or alternatively as a desired main functionality, a liquid authenticity may be checked. The liquid authenticity may be checked by the electronic cigarette itself and/or by establishing a wireless communication with an external circuit, e.g. an external communication device such as a smartphone, and the like.

The electronic cigarette and the method for operating the electronic cigarette, as described herein, may help to prevent or at least to reduce the usual "more than 18 years old friend" workaround for a conventional age-check. Usually, when typical lower-age adolescent-groups hang around, most of them are at the same age (i.e. under-age). Therefore, at the moment when "lighting" the electronic cigarette there might be no other more than 18 years old friend near to help starting the electronic cigarettes. These older friends usually help purchasing, but often are not present when smoking.

FIG. 1 illustrates a schematic view of an electronic cigarette 100, according to various embodiments. The electronic cigarette 100 may include a mouth piece 102m, a body 102, a heater 106, a processor 110, a wireless communication circuit 108 and a verification circuit 112.

The heater 106 may be configured to vaporize a liquid. The heater 106 may be a resistive heater, i.e. including a resistive heating element, to provide heat via an electrical current flow though the resistive heating element. However, there may be similar possibilities to vaporize the liquid. The heater 106 may be also referred to as vaporizer configured to vaporize the liquid.

The mouth piece 102m of the electronic cigarette 100 may be attached to the body 102 of the electronic cigarette 100. Illustratively, the body 102 may provide a housing of the electronic cigarette 100. The mouth piece 102m may have an opening and may be configured to allow a user of the electronic cigarette 100 to inhale vaporized liquid 104v. The mouth piece 102m may be configured to deliver the vaporized liquid 104v to a user of the electronic cigarette 100. The liquid to be vaporized and inhaled by the user may be stored in a container, also referred to as liquid container, cf. for example FIG. 3

The processor 110 of the electronic cigarette 100 may be configured to control the heater 106. The processor may include any suitable circuit structure, e.g. in form of a microprocessor or any other controller. According to various embodiments, the processor 110 may be configured to control the heater 106 to vaporize the liquid. Therefore, in case the heater 106 is configured as a resistive heater, the processor 110 may be configured to control an electrical heating current flow through the resistive heater 106. According to various embodiments, the electronic cigarette 100 may optionally include at least one sensor, e.g. a temperature sensor (not illustrated) to assist the control of the heater. The temperature may be for example integrated as a measurement variable in a control loop for controlling the heater 106. According to various embodiments, the electronic cigarette 100 may optionally include at least one sensor that is configured to turn the electronic cigarette 100 on and off in dependency of a use of the electronic cigarette 100.

Figure 11:
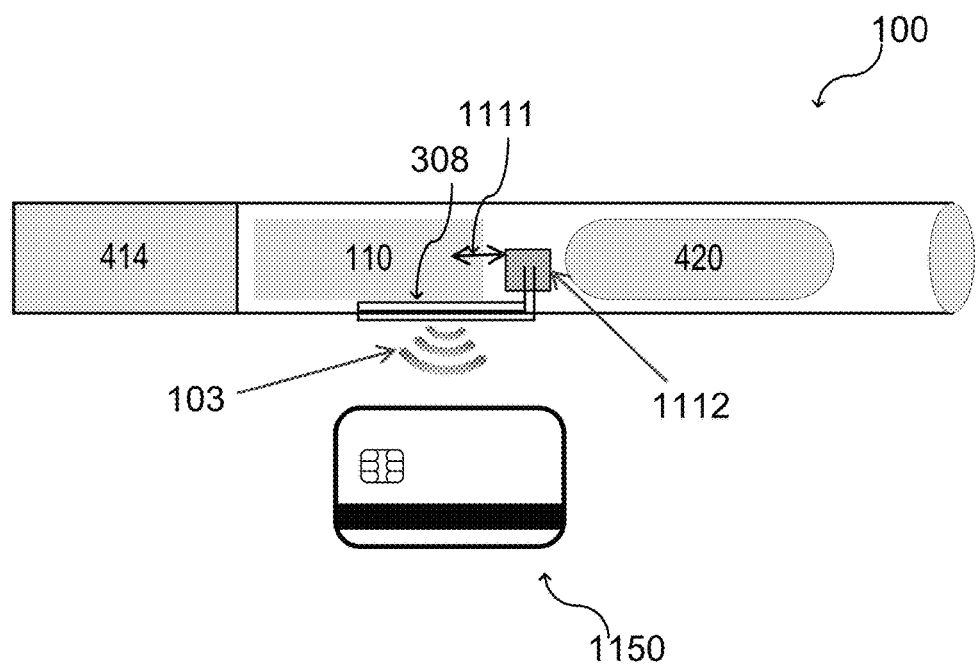
FIGS. 11 to 13 show respectively an electronic cigarette arrangement in a schematic view, according to various embodiments.
Figure 12:
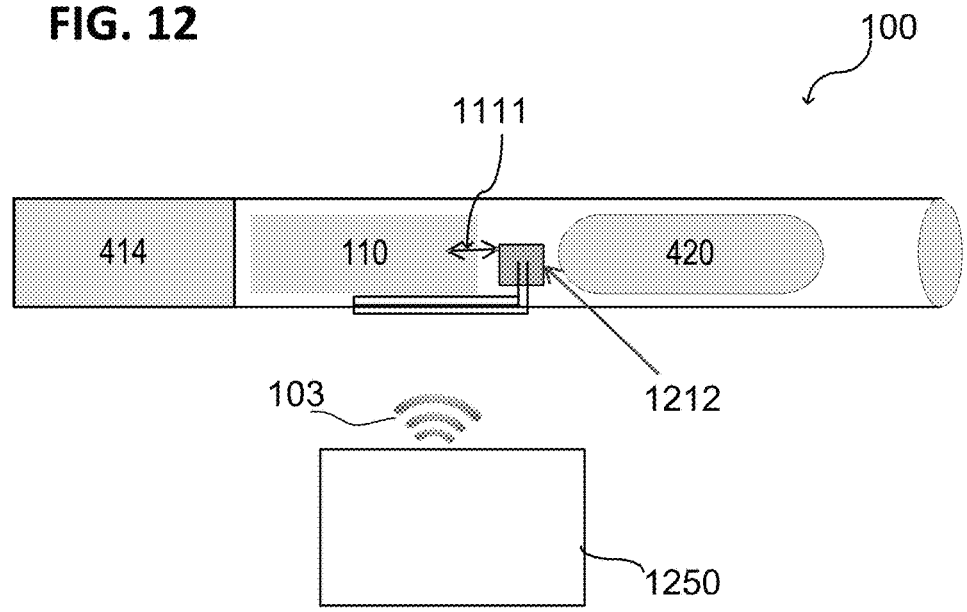
Figure 13:
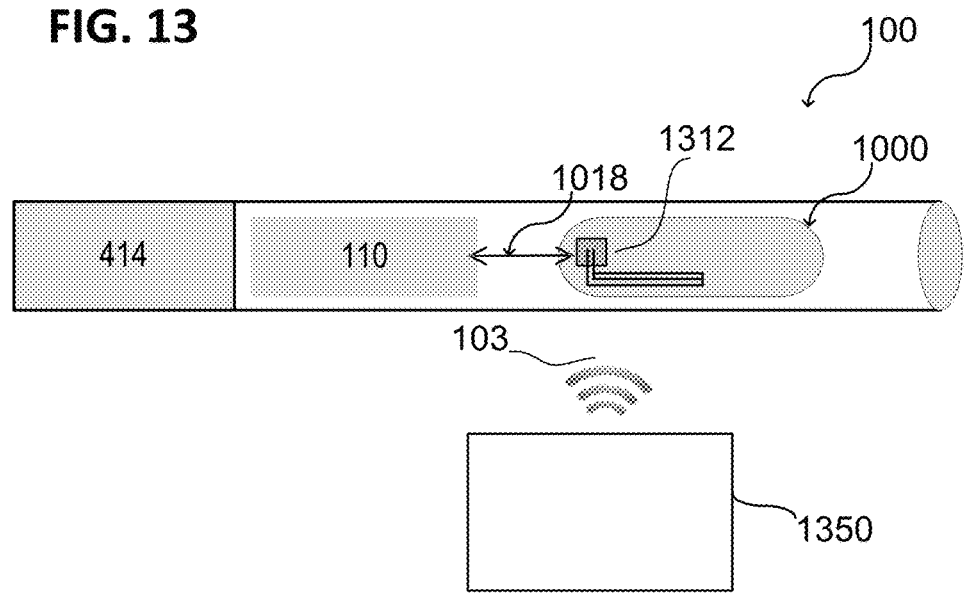

The wireless communication circuit 108 may be configured to communicate 103 with an external communication device, e.g. with any suitable external communication circuit (cf. FIGS. 11 to 13). The direction and or origination/initiation of the wireless communication 103 can be in both directions as also sketched in the figures. The external communication device may be a separate device, e.g. functionally independent (i.e. autonomously) from the electronic cigarette 100. The wireless communication circuit 108 may be an active wireless communication circuit or passive wireless communication circuit. According to various embodiments, an active wireless communication circuit may be configured to read out data from the external communication device and a passive wireless communication circuit may be configured to be read out by the external communication device. According to various embodiments, the wireless communication circuit may be configured both to read out data from the external communication device and to be read out by the external communication device. The wireless communication circuit 108 may include or may be an NFC-circuit, e.g. an active or passive NFC-circuit. The wireless communication circuit 108 may include or may be another alternative active low-power wireless communication circuit (or protocol) such as Bluetooth/Bluetooth-Low-Energy, or WiFi, ZigBee, Z-Wave or other related existing or upcoming protocols which are designed for users to control electronic devices over typical Personal-Area-Networking distances (e.g. a few meters). The wireless communication circuit 108 may be referred to as wireless communication interface configured to communicate 103 with a communication device. The wireless communication circuit 108 may be provided as an autonomously working circuit (e.g. provided by a wireless communication chip) or may be integrated into the processor 110 of the electronic cigarette 100.

The verification circuit 112 may be configured to start operation of the electronic cigarette 100 upon receipt of a signal transmitted by the external communication device via the wireless communication circuit. The verification circuit 112 may be configured to communicate with the processor 110 of the electronic cigarette 100 or may be switched between the processor 110 and the heater 106 to allow starting operation of the electronic cigarette 100 only if an enable signal is transmitted to the processor 110. Illustratively, the verification circuit 112 blocks starting operation of the heater 106, of the processor 110, or of any other component of the electronic cigarette 100, so that the electronic cigarette 100 can only be started if the verification circuit 112 allows this. However, once the operation of the electronic cigarette 100 is started, the electronic cigarette 100 can operated for a predefined time or until the user stops the operation of the electronic cigarette 100 again. Illustratively, only starting the electronic cigarette 100 may be controlled by the verification circuit 112. The verification circuit 112 may allow starting operation of the electronic cigarette 100 based on the received signal from the external communication device.

Based for example on a result of an age-check, carried out by the wireless communication circuit and/or by the verification circuit 112, the verification circuit 112 stops blocking start of an operation of the electronic cigarette 100 or, in other words, allows starting operation of the electronic cigarette 100. The operation or at least the start of the operation of the electronic cigarette 100 may be controlled (i.e. blocked or allowed) by the verification circuit 112 in various different ways leading to the same result, that the operation of the electronic cigarette 100 is only possible if a corresponding signal was received before. The verification circuit 112 may be configured to allow starting the electronic cigarette 100 only one time after the corresponding signal has been received. Further, the verification circuit 112 may be configured to allow starting the electronic cigarette 100 within a predefined period of time after the corresponding signal has been received, e.g. within a narrow time frame, e.g. of about 5 minutes, or more or less than 5 minutes.

The verification circuit 112 may be provided as an autonomously working circuit (e.g. provided by a verification chip or secure element) or may be integrated into the processor 110 of the electronic cigarette 100 in hardware or firmware, and/or into the wireless communication circuit 108 in hardware or firmware.

According to various embodiments, the verification circuit 112 and the wireless communication circuit 108 may be provided as an add-on kit for conventional electronic cigarettes 100 including a conventional processor 110.

Figure 2A:
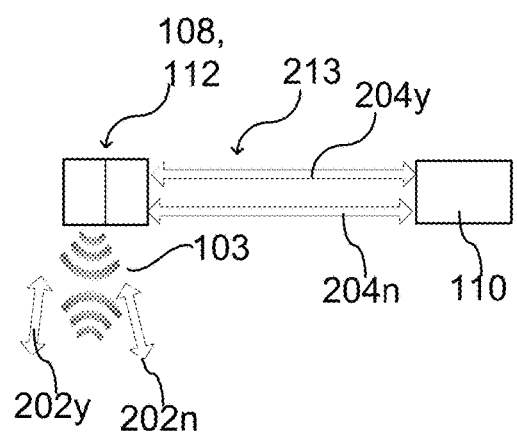
FIGS. 2A to 2C show respectively a wireless communication circuit, a verification circuit, and/or a processor of an electronic cigarette in a schematic view, according to various embodiments.

FIG. 2A illustrates a control scheme of a communication 103 between the wireless communication circuit 108, the verification circuit 112, and the processor 110 for blocking or enabling the operation of the electronic cigarette 100 respectively.

In the case that the external communication device carries out the age-check, a signal 202y (e.g. an enable signal) may be transmitted to the verification circuit 112 via the wireless communication circuit 108 and, based on the transmitted signal 202y, the verification circuit 112 may allow start operation of the electronic cigarette 100. Further, the verification circuit 112 may be configured to block 204n the start of the operation of the electronic cigarette 100 upon receipt of a block signal 202n, upon not receiving a signal, or upon receipt of any other signal 202n, which is not the enable signal 202y. Therefore, depending on the result of the age-check, an enable signal 202y or a block signal 202n is transmitted to the verification circuit 112 by the wireless communication circuit 108, and only in case the enable signal 202y is received, the verification circuit 112 allows starting the electronic cigarette 100.

Alternatively, in the case that the verification circuit 112 carries out the age-check based on a signal 202y (e.g. a user information signal) transmitted from the external communication device via the wireless communication circuit 108, the verification circuit 112 may be configured to allow start operation of the electronic cigarette 100 based on the transmitted signal 202y. In case the user information signal leads to a positive age-check, the verification circuit 112 may be configured to allow start operation of the electronic cigarette 100. In the other case, if the user information signal leads to a negative age-check (under-age), the verification circuit 112 may be configured to block the start the electronic cigarette 100. Further, the verification circuit 112 may be configured to block 204n the start of the operation of the electronic cigarette 100 while not receiving a signal, or upon receipt of any other signal 202n, which is not a user information signal 202y. Therefore, depending on the result of the age-check based on the signal 202y, 202n received by the verification circuit 112 via the wireless communication circuit 108, the verification circuit 112 allows starting operation of the electronic cigarette 100.

Illustratively, the verification circuit 112 may be configured to allow 204y the start of an operation of the electronic cigarette 100 upon receipt of an corresponding signal 202y transmitted by an external communication device via the wireless communication circuit 108 and to block 204n the start of the operation of the electronic cigarette 100 upon receipt of a block signal 202n, upon not receiving any signal, or upon receipt of any other signal 202n, which is not the corresponding signal 202y.

According to various embodiments, in case a block 204n signal is received, the electronic cigarette 100 may not start for a predefined time duration or until an unblock processes is carried out.

The verification circuit 112 may be configured to communicate 213 with the processor 110, e.g. based on a wired communication circuit 213 (i.e. on a wired communication interface).

According to various embodiments, the verification circuit 112 may be configured to perform an operation permission verification based on the received signal 202y, 202n. If the received enable signal 202y, 202n is identical to a predefined reference signal, the operation permission verification may be positive and the start of the operation of the electronic cigarette 100 may be allowed (i.e. not blocked any more). If the received enable signal 202y, 202n differs from a predefined reference signal or if no signal is received, the operation permission verification may be negative and the start of the operation of the electronic cigarette 100 may not be allowed (i.e. remains blocked).

As described before, according to various embodiments, the electronic cigarette 100 may include a wireless communication circuit 108 configured to communicate with an external communication device; and a verification circuit 112 configured to allow starting of an operation of the electronic cigarette 100 upon receipt of a signal transmitted by the external communication device via the wireless communication circuit 108 and to block the starting of the operation of the electronic cigarette 100 in any other case. Illustratively, the verification circuit 112 may be configured to allow starting of an operation of the electronic cigarette 100 only upon receipt of a corresponding signal transmitted by the external communication device via the wireless communication circuit 108.

According to various embodiments, the communication of components within the electronic cigarette 100 (e.g. between the verification circuit 112 and the processor 110, between the wireless communication circuit 108 and the verification circuit 112) may be wireless or wired, as respectively desired. The communication of the electronic cigarette 100 with an external communication device, such as a smartphone, a bank card, and the like, may be only wireless therefore providing convenience in handling while performing the age-verification and/or other functions.

Figure 2B:
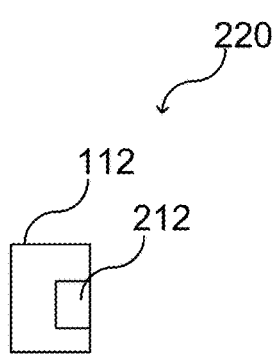
Figure 2C:
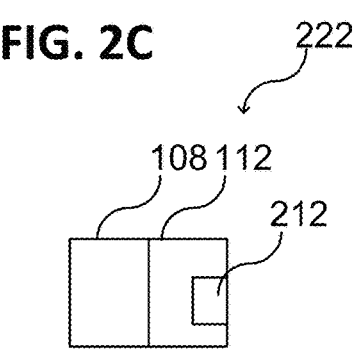

FIG. 2B and FIG. 2C illustrates the verification circuit 112, according to various embodiments, in a schematic view. The verification circuit 112 may include a secure element 212 configured to provide at least one cryptographic service. According to various embodiments, the verification circuit 112 may optionally include a memory. The cryptographic service may be configured to secure communication of the verification circuit 112 and to secure data stored within the verification circuit 112, e.g. reference data, keys and the like used for age-verification or authentication. According to various embodiments, the secure element 212 may include or may be an engine for public key cryptography, e.g. an RSA (Ron Rivest, Adi Shamir, and Leonard Adleman) cryptosystem or an ECC (Elliptic Curve Cryptography) cryptosystem. Further, the secure element 212 may include or may be a symmetric Crypto Processor (SCP). Alternatively, any other suitable cryptographic service may be provided via the secure element 212. According to various embodiments, the cryptographic service may include encoding and/or decoding processes.

According to various embodiments, the verification circuit 112 may be configured to perform an authorization process, namely to allow only users of a predefined user group to actually use the electronic cigarette 100. Therefore, an authentication process may be used to verify that a user is actually that one he pretends to be. Further, an authorization may be used, e.g. after the authentication process has been carried out, to verify whether a user is part of the predefined user group or not and whether the user is therefore allowed to start the electronic cigarette 100 or not.

As illustrated in FIG. 2B, the verification circuit 112 including the secure element 212 may be a separate circuit 220. Alternatively, the wireless communication circuit 108 and the verification circuit 112 including the secure element 212 may be also integrated into a single circuit 222, e.g. into a single chip 222. According to various embodiments, an NFC Secure Element 222 or a Boosted NFC Secure Element 222 may be used to provide the desired functions.

Figure 3A:
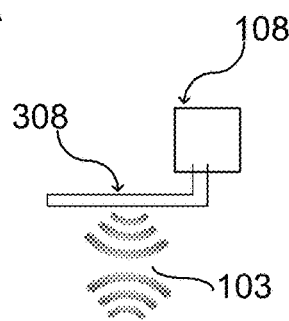
FIGS. 3A and 3B show respectively a wireless communication circuit and/or a verification circuit of an electronic cigarette in a schematic view, according to various embodiments.
Figure 3B:
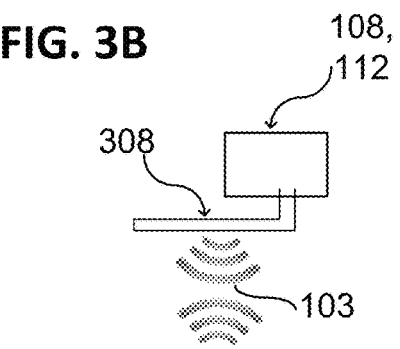

FIG. 3A and FIG. 3B illustrate a wireless communication circuit 108 and a verification circuit 112 of the electronic cigarette 100 in a schematic view, according to various embodiments, wherein a booster antenna structure 308 is coupled to the wireless communication circuit 108 and/or to the verification circuit 112. The booster antenna structure 308 may be part of the wireless communication circuit 108. As described before, the wireless communication circuit 108 may include or may be part of an NFC-Controller or NFC-Chip including dedicated secure elements or may include or may be part of a different active low-power wireless communication chip such as Bluetooth.

According to various embodiments, the booster antenna structure 308 may include a ferrite antenna. The ferrite antenna may include a loop antenna wound on a ferrite rod.

Figure 4:
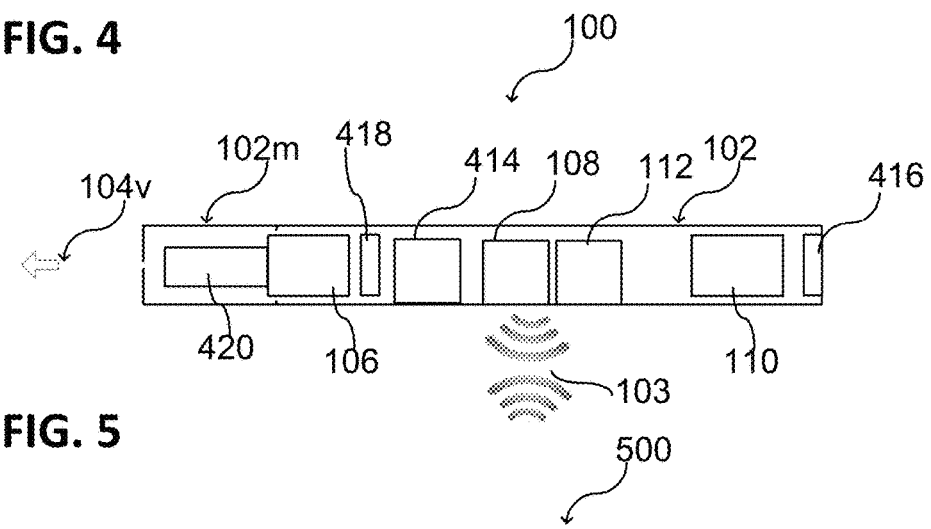
FIG. 4 shows an electronic cigarette in a schematic view, according to various embodiments.

FIG. 4 illustrates a schematic view of an electronic cigarette 100, according to various embodiments. The electronic cigarette 100 may include a mouth piece 102*m*, a body 102, a heater 106, a processor 110, a wireless communication circuit 108 and a verification circuit 112 as described before with reference to FIG. 1 and, for example, with reference to FIGS. 2A to 2C, 3A and/or 3B.

According to various embodiments, the electronic cigarette 100 may further include a liquid container 420 disposed within the electronic cigarette 100. The liquid container 420 may be removably mounted in the electronic cigarette 100. The heater 106 may be coupled to the liquid container 420 to vaporize liquid out of the liquid container 420. The liquid container 420 may have at least one opening or may be at least partially permeable so that liquid can be vaporized. The liquid container 420 and the mouth piece 102*m* may be configured such that the vaporized liquid can be inhaled by the user. The liquid container 420 may be mounted inside the electronic cigarette 100 via a mounting structure (not illustrated). According to various embodiments, the heater 106 may have a heating coil or may be coupled to a heating coil, wherein the heating coil may at least partially surround the liquid container 420 mounted in the electronic cigarette 100. The heater 106 may have a driver circuit configured to provide an electric heating current through the heating coil (not illustrated).

According to various embodiments, the electronic cigarette 100 may further include a battery 414, e.g. a rechargeable battery, e.g. a lithium ion battery, or any other suitable type of electrical energy storage. The battery 414 may be configured (e.g. including a respective wiring) to support the electric components of the electronic cigarette 100 with power.

According to various embodiments, the electronic cigarette 100 may further include one or more sensors 418. At least one sensor 418 may be configured to detect use of the electronic cigarette 100. Further, the at least one sensor 418 may be configured to activate the processor 110 if use of the electronic cigarette 100 is detected. The at least one sensor 418 may be configured to save energy while the electronic cigarette 100 is not in use. The at least one sensor 418 may be coupled to the processor 110.

According to various embodiments, the electronic cigarette 100 may further include a light source 416, e.g. a light emitting diode, e.g. an organic light emitting diode, or any other suitable light source. The light source 416 may be positioned so that a light is emitted from the electronic cigarette 100. The light source 416 may be configured to indicate when the electronic cigarette 100 is in use; in this case the light source 416 is switched on and correspondingly emits light. The light source 416 may be controlled by the processor 110.

According to various embodiments, the electronic cigarette 100 may be built in various ways differing from the structure described herein; however, with the same or similar principle of operation.

The wireless communication circuit 108 may include or may be provided by a wireless communication circuit chip, e.g. an active or passive NFC chip or NFC-Controller. The wireless communication circuit 108 as described herein may be understood as logical structure (e.g. a wireless communication interface) linking the electronic cigarette 100 to an external device. Alternatively, the wireless communication circuit 108 as described herein may be understood as a physical structure, e.g. as controller or chip configured to provide the wireless communication 103. The verification circuit 112 may be integrated into a wireless communication chip or the wireless communication circuit 108 may be integrated into a verification chip.

Figure 5:
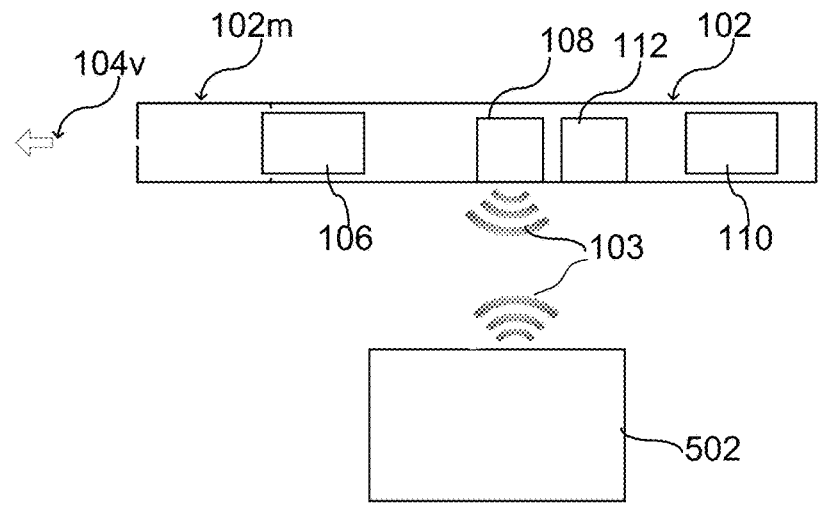
FIG. 5 shows an arrangement including an electronic cigarette and a communication device, according to various embodiments.

FIG. 5 illustrates an electronic cigarette arrangement 500 in a schematic view, according to various embodiments. The electronic cigarette arrangement 500 may include: an electronic cigarette 100, e.g. as described before for example with reference to FIGS. 1 to 4. The electronic cigarette 100 may include a heater 106 configured to vaporize a liquid; a mouth piece 102*m* to deliver the vaporized liquid to a user of the electronic cigarette 100; a processor 110 configured to control the heater 106 to vaporize the liquid; a wireless communication circuit 108 configured to communicate with a communication device 502 (e.g. with an external communication device as described before); a verification circuit 112 configured to start the operation of the electronic cigarette 100 upon receipt of a signal transmitted by the communication device 502 via the wireless communication circuit 108; the electronic cigarette arrangement 500 further including the communication device 502 coupled to the electronic cigarette 100 via the wireless communication circuit 108.

The communication device 502 may include operation permission information about a user of the electronic cigarette. Therefore, the communication between the communication device 502 and the electronic cigarette 100 may include transmitting 103 a signal that authorizes a user to use (i.e. start operating) the electronic cigarette 100.

According to various embodiments, the operation permission information may include age information about the user of the electronic cigarette 100. In other words, the operation permission information may include age information about the holder or owner of the communication device 502, wherein the verification circuit 112 of the electronic cigarette 100 is configured to perform operation permission verification based on the age information.

According to various embodiments, the communication device 502 may be a contactless chip card (cf. FIG. 11). The contactless chip card may include for example a passive a wireless communication circuit that can be read out by the verification circuit 112 via the wireless communication circuit 108. Further, the verification circuit 112 and/or the wireless communication circuit 108 may include or may be a near field communication reader device configured to read out the contactless chip card.

According to various embodiments, the communication device 502 may be a mobile communication device, e.g. a smartphone and the like (cf. FIGS. 12 and 13). According to various embodiments, the communication device 502 may include a near field communication reader device. Further, the verification circuit 112 and/or the wireless communication circuit 108 may include a passive a wireless communication circuit that can be read out by the mobile communication device.

According to various embodiments, the communication device 502 may be configured to perform operation permission verification and to generate the signal based on the verification result.

Figure 6:
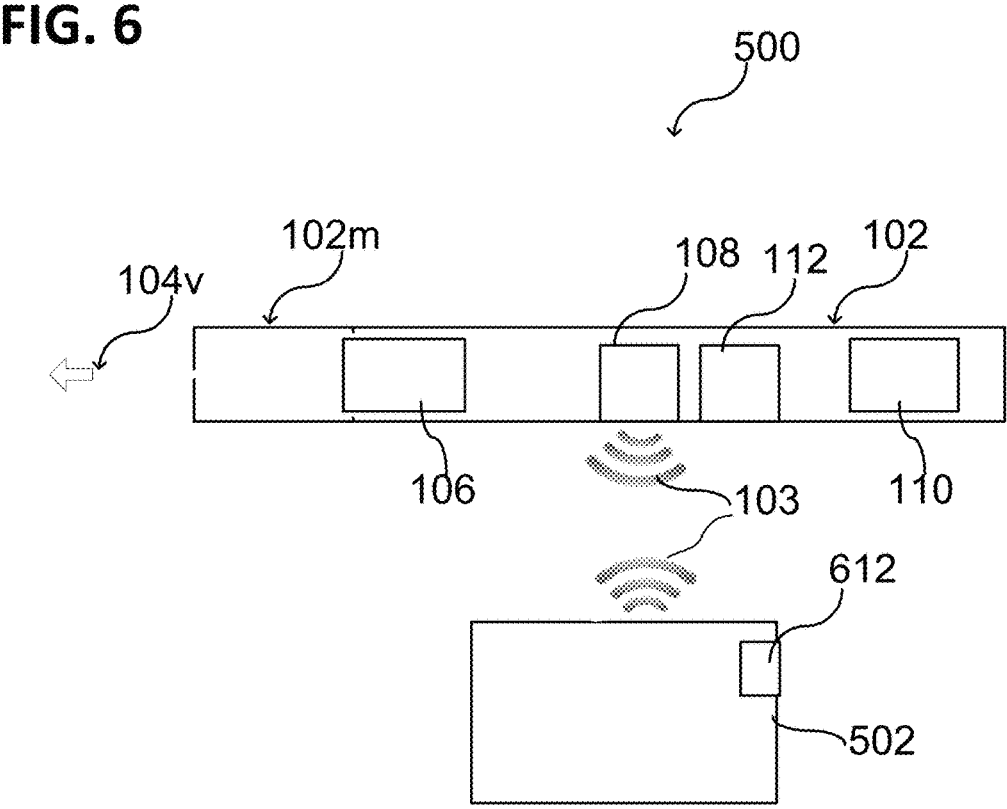
FIG. 6 shows a communication device of an electronic cigarette arrangement in a schematic view, according to various embodiments.

As illustrated in FIG. 6, according to various embodiments, the communication device 502 may include a secure element 612 configured to provide at least one cryptographic service, similar to the secure element 212 of the verification circuit 112 described herein.

Illustratively, at least one of the electronic cigarette 100 and the communication device 502 may be configured to check operation permission information and based on this result a potential user of the electronic cigarette 100 may be allowed to start the operation of the electronic cigarette 100 or may not be allowed to start the operation of the electronic cigarette 100.

Figure 7:
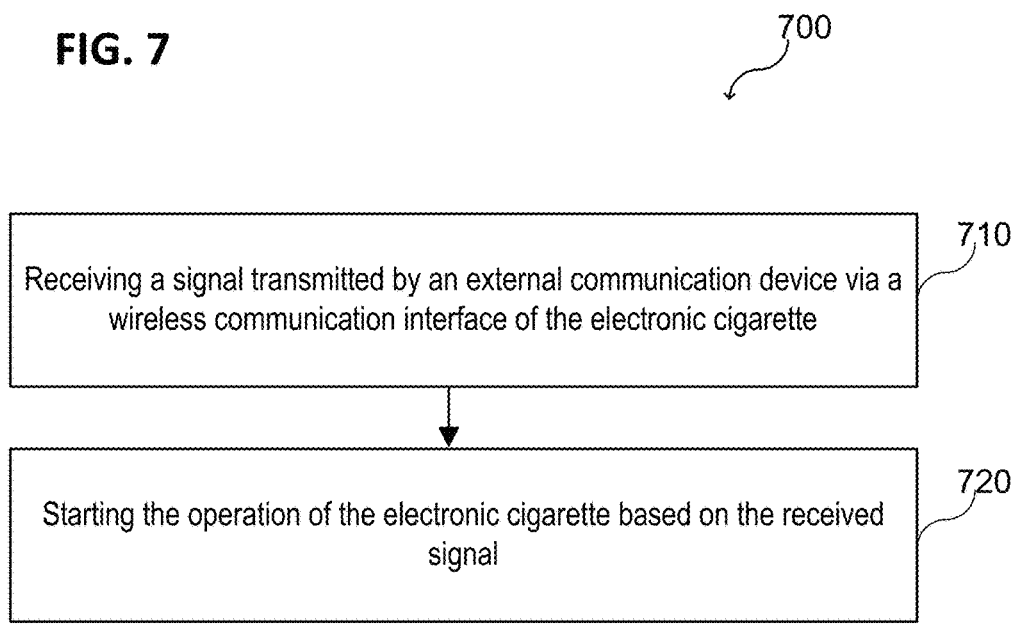
FIGS. 7 to 9 show respectively a method for operating an electronic cigarette in a schematic flow diagram, according to various embodiments.

FIG. 7 illustrates a schematic flow diagram of a method 700 of operating an electronic cigarette 100, according to various embodiments. This method may be carried out to include one or more details of operation of the electronic cigarette 100 described herein. The method 700 may include: in 710, receiving a signal transmitted by an external communication device via a wireless communication circuit of the electronic cigarette; and, in 720, starting operation of the electronic cigarette based on the received signal.

Figure 8:
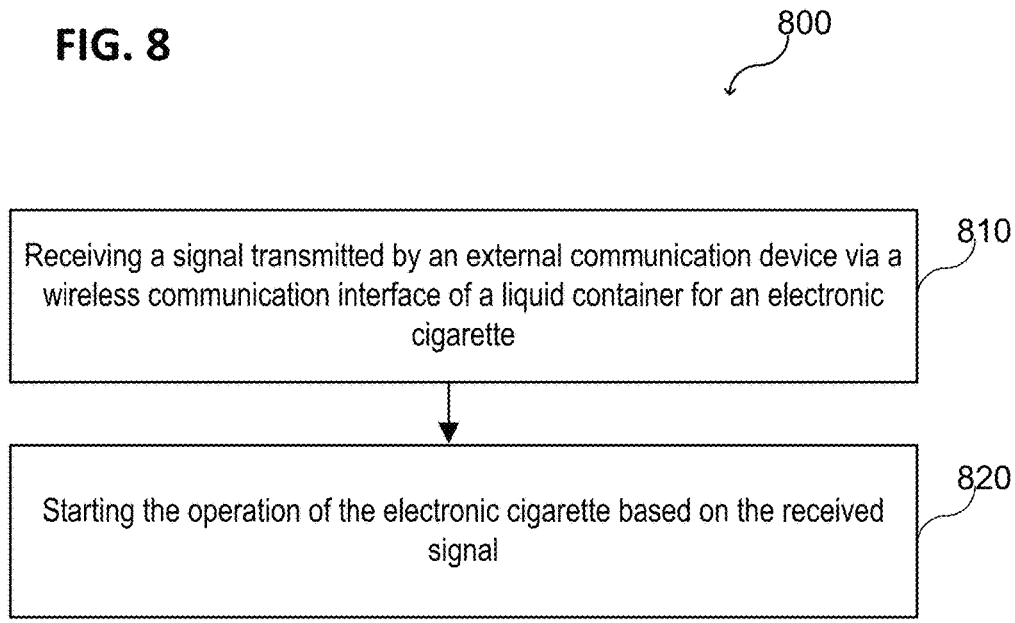

FIG. 8 illustrates a schematic flow diagram of a method 800 of operating an electronic cigarette 100, according to various embodiments. This method may be carried out to include one or more details of operation of the electronic cigarette 100 and the liquid container described in further detail below. The method 800 may include: in 810, receiving a signal transmitted by an external communication device via a wireless communication circuit of a liquid container for the electronic cigarette; and, in 820, starting operation of the electronic cigarette based on the received signal.

Figure 9:
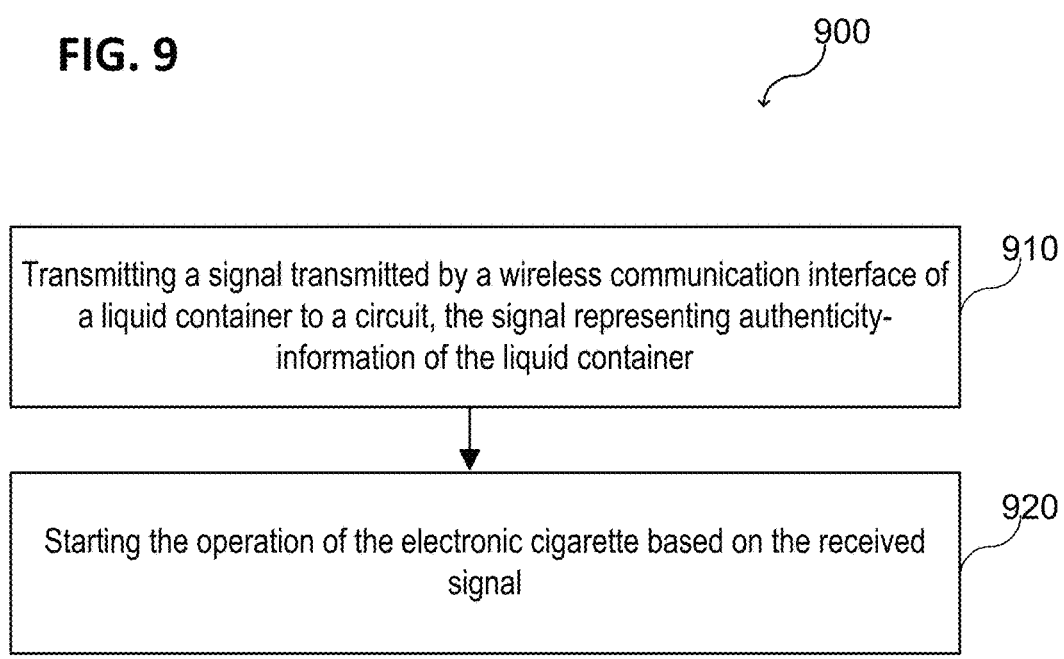

FIG. 9 illustrates a schematic flow diagram of a method 900 of operating an electronic cigarette 100, according to various embodiments. This method may be carried out to include one or more details of operation of the electronic cigarette 100 and the liquid container described in further detail below. The method 900 may include: in 910, transmitting a signal by a wireless communication circuit of a liquid container to a verification circuit, the signal representing authenticity-information of the liquid container; and, in 920, starting operation of the electronic cigarette based on the received signal.

Figure 10:
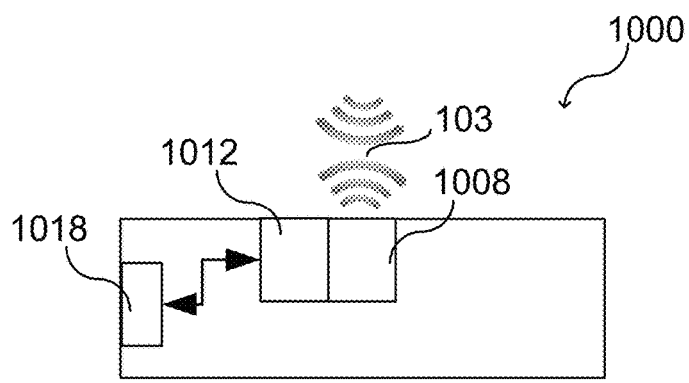
FIG. 10 shows a liquid container for an electronic cigarette, according to various embodiments.

FIG. 10 illustrates a liquid container 1000, according to various embodiments. The liquid container 1000 may be used with a standard electronic cigarette or with the electronic cigarette 100 described herein. According to various embodiments, the liquid container 1000 may include a wireless communication circuit 1008 and a verification circuit 1012 that are configured to communicate wireless with an external device or with an external circuit. The liquid container 1000 may further include a wired communication circuit 1018 configured to communicate with an electronic cigarette, as described herein. According to various embodiments, an electronic cigarette may include a processor that is connected to the wired communication circuit 1018, thereby, the wireless communication circuit 1008 and a verification circuit 1012 may be incorporated into the electronic cigarette in a similar way as described for the wireless communication circuit 108 and a verification circuit 112 of the electronic cigarette 100 with reference for example to FIGS. 1 to 9. Additionally, the wireless communication circuit 1008 and a verification circuit 1012 of the liquid container 1000 may be configured to check and/or provide information about the liquid or the liquid container 1000. The information about the liquid or the liquid container 1000 may be considered in the process of allowing a start of the electronic cigarette 100. For example, if a liquid container 1000 is manipulated or if a liquid may not be suitable or desired for the use with the electronic cigarette 100, the start of the electronic cigarette 100 may be blocked. This check can be carried out by the verification circuit 1012 of the liquid container 1000, or alternatively, by the external communication device.

FIG. 11 illustrates a schematic view of an electronic cigarette 100 and an external communication device 1150, according to various embodiments. The electronic cigarette 100 may include, in analogy to the electronic cigarette 100 described before, a battery 414 (e.g. standard electronic cigarette battery), a processor 110 (e.g. standard electronic cigarette electronics), a liquid container 420 (e.g. a standard electronic cigarette liquid cavity). Further, according to various embodiments, a contactless (also referred to as wireless) communication interface may be provided by an NFC-Reader-Chip 1112 including (e.g. optionally) a secure element for age-verification and/or for other functions, as described herein.

The electronic cigarette 100 illustrated in FIG. 11 may be configured to be backwards-compatible with banking-/smart-cards available on the market and also with NFC-capable smartphones. The NFC-Reader-Chip 1112 may be a low-power NFC-reader-chip. The NFC-Reader-Chip 1112 may include or may be coupled with an antenna 408, as described herein for example with reference to FIGS. 3A and 3B. The NFC-Reader-Chip 1112 may be integrated into the e-cigarettes components and coupled to the processor 110 of the electronic cigarette 100. The processor 110 may be a low-power microcontroller. The processor 110 may be configured to check the age of the user and data-signature verification before starting the ignition of the electronic cigarette 100. By using an active reader-chip 1112, as illustrated in FIG. 11, it may be possible to read passive NFC/RFID smart-cards 1150, such as banking-cards (which already provide age information). However, also smartphones may provide age information that can be read out by the active reader-chip 1112. The internal communication 1111, e.g. between the processor 110 and the NFC-Reader-Chip 1112 may be provided wire-based.

According to various embodiments, an age-verification may be carried out every time before starting the heater of the electronic cigarette 100. Optionally, a dedicated secure element may be used to perform the are-verification in a more secure manner, as described herein. Further, a dedicated secure-element may be integrated into the electronic cigarette 100 and configured to perform the signature-check in a more secured and energy-efficient manner. According to various embodiments, the electronic cigarette 100 may include a button to start operation of the electronic cigarette

100. After pressing the button of the electronic cigarette 100, the NFC/RFID-reader 1112 integrated into the electronic cigarette 100 starts up and checks for a banking-card/ smartcard 1150 or for a smartphone 1150. Then the processor 110 or secure element (e.g. the verification circuit) of the electronic cigarette 100 may perform the age-check and/or the verification of the read data and finally starts the ignition of the electronic cigarette 100.

FIG. 12 illustrates a schematic view of an electronic cigarette 100 and an external communication device 1250, according to various embodiments, similar to the electronic cigarette 100 illustrated in FIG. 11, wherein a passive NFC-Chip 1212 is used instead of an active NFC-Chip 1112 (i.e. instead of the NFC-Reader-Chip 1112). The passive NFC-Chip 1212 may be read out and controlled by the external communication device 1250, e.g. by a smartphone. In this case, a passive external communication device may not be suitable to communicate with the electronic cigarette 100. The passive NFC-Chip 1212 of the electronic cigarette 100 may include a secure element, as described before. The external communication device 1250 may be configured to provide user and/or age information. According to various embodiments, user and/or age information may be securely signed and stored in a secure element of the smartphone 1250, as described before. Illustratively, according to various embodiments, the external communication device 1250 and the passive NFC-Chip 1212 (e.g. the verification circuit 112) may both include a respective secure element corresponding to each other.

According to various embodiments, the electronic cigarette arrangement including the electronic cigarette 100 and the external communication device 1250 may be configured so that after purchase, the electronic cigarette 100 could be permanently bound to only one phone and/or age-verified user. This may prevent asking any more than 18 years old for help smoking the electronic cigarette 100. The passive NFC-Chip 1212 (described for example with reference to FIG. 12) may cause less cost-overhead and less power-consumption of the electronic cigarette 100 compared to an active NFC-reader-chip 1112 (described for example with reference to FIG. 11).

FIG. 13 illustrates a schematic view of an electronic cigarette 100 including a liquid container 1000, as described with reference to FIG. 10, according to various embodiments. Further, FIG. 13 illustrates a schematic view of an arrangement including an electronic cigarette 100 and an external communication device 1350 (in analogy to the configurations described with reference to FIGS. 11 and 12). For example, it may be desired to check information of the liquid container 1000, e.g. origin and distribution channels of the liquid container 1000, the quality of the liquids, product piracy, the compatibility of the liquids containers with the electronic cigarette 100, and the like.

Further, according to various embodiments, the liquid container 1000 may be configured, e.g. additionally or as a main function, to perform the age-verification as described herein with reference to the electronic cigarette 100. Therefore, the liquid container 1000 may include a wireless communication circuit 1008 and a verification circuit 1012 that are configured in a similar or the same way as described herein with reference to the electronic cigarette 100. Illustratively, according to various embodiments, the liquid container 1000 may be configured to communicate with an external communication device 1350 to perform the age-verification as described herein with reference to the electronic cigarette 100. A processor 110 of the electronic cigarette 100 may further communicate 1018 with the liquid container 1000 and configured to only start operation of the electronic cigarette 100 if an age-verification for the user is positive. The liquid container 1000 may be coupled to the processor 110 of the electronic cigarette 100 via a wiring 1018. The wireless communication circuit 1008 and a verification circuit 1012 may be included in or provided by an active or passive NFC-device 1312, in analogy to the configurations described with reference to FIGS. 11 and 12. In case an active NFC-device 1312 is used in the liquid container 1000, the external communication device 1350 may be an active or passive device. However, in case a passive NFC-device 1312 is used in the liquid container 1000, the external communication device 1350 may be an active device, as described before with reference to FIGS. 11 and 12.

According to various embodiments, the liquid container 1000 may be configured to communicate 103 with the external communication device 1350 and/or to communicate 1018 with the electronic cigarette 100 to authenticate the liquid container 1000 and/or the liquid inside the liquid container 1000. Therefore, if the liquid container 1000 and/or the liquid may be manipulated, faked, of low quality and the like, the operation of the electronic cigarette 100 may be blocked. Correspondingly, if the liquid container 1000 and/or the liquid may be authenticated as original ones, the operation of the electronic cigarette 100 may be permitted. Additionally, the operation of the electronic cigarette 100 may be only permitted if the age-verification for the user is positive as well. Providing a communication between the electronic cigarette 100 and the liquid container 1000 and/or between the liquid container 1000 and a communication device 1350, e.g. a smartphone, the abusive use of liquid container 1000 and manipulated liquids can be detected, and for example prevented. According to various embodiments, the electronic cigarette 100 may be configured to check both, the age of the user and the origin of the liquid container 1000 and may only allow an operation of the electronic cigarette 100 or the activation of the electronic cigarette 100 if both checks are positive. The reference data for the check may be provided in the verification circuit of the electronic cigarette 100 and/or in the communication device.

According to various embodiments, a liquid container 1000 may be provided, wherein the liquid container 1000 includes a wireless communication circuit 1008 and a verification circuit 1012 that are configured to communicate with an external circuit, e.g. with a processor 110 of the electronic cigarette 100 or with a communication device (cf. FIG. 10). The liquid container 1000 may be configured to be inserted into an electronic cigarette.

According to various embodiments, a liquid container 1000 for use with an electronic cigarette 100 may include: a wireless communication circuit 1008 configured to communicate with an external communication device; and a verification circuit 1012 configured to communicate with a processor 110 of the electronic cigarette 100 to start operation of the electronic cigarette 100 upon receipt of a signal transmitted by the external communication device via the wireless communication circuit 1008 (cf. FIG. 10).

According to various embodiments, the verification circuit 1012 disposed in and/or at the liquid container 1000 may be configured to perform an operation permission verification based on the received signal, as described before with reference to the verification circuit 112 of the electronic cigarette 100. The verification circuit 1012 disposed in and/or at the liquid container 1000 may include a secure element configured to provide at least one cryptographic service, as described before with reference to the secure element 212 of the electronic cigarette 100. The wireless communication 103 between the liquid container 1000 and the external communication device may be configured as at least one of an inductive coupling communication interface or capacitive coupling communication interface. The wireless communication 103 between the liquid container 1000 and the external communication device may be configured as a near field communication interface. The wireless communication 103 between the liquid container 1000 and the external communication device may further include a near field communication reader device. The verification circuit 1012 disposed in and/or at the liquid container 1000 may be configured to include at least one predefined identity of a permitted user of the electronic cigarette.

According to various embodiments, a liquid may be disposed within the liquid container 420, 1000, as described herein. The liquid may contain nicotine. According to various embodiments, the verification circuit 1012 disposed in and/or at the liquid container 1000 may be further configured to provide authenticity-information of the liquid in the liquid container 100 via the wireless communication circuit 1008 to the external communication device. According to various embodiments, the verification circuit 1012 disposed in and/or at the liquid container 1000 may be configured to provide authenticity-information of the liquid in the liquid container 1000 via a further communication circuit 1018 to the processor 110 of the electronic cigarette 100 (cf. FIG. 10).

According to various embodiments, a booster antenna structure may be optionally coupled to the verification circuit 1012 or integrated into the verification circuit 1012 disposed in and/or at the liquid container 1000. The booster antenna structure may include a ferrite antenna.

According to various embodiments, a liquid container for an electronic cigarette may include at least one communication interface 1008, 1018 configured to communicate with at least one external circuit; and an internal circuit 1012 configured to provide authenticity-information of a liquid in the liquid container 1000 via the at least one communication interface 1008, 1018 to the at least one external circuit.

The at least one external circuit may be or may include an external communication device (e.g. a bank-card or a smartphone as described herein), wherein in this case the at least one communication interface 1008, 1018 may be configured as or may include a wireless communication circuit 1008.

The at least one external circuit may be or may include a processor 110 (or another circuit) of an electronic cigarette 100. In this case the at least one communication interface 1008, 1018 may be configured as or may include wire-based communication interface 1018.

According to various embodiments, the internal circuit 1012 may be further configured to communicate 1018 with the processor 110 of the electronic cigarette 100 to start operation of the electronic cigarette 100 upon receipt of a signal transmitted by the external communication device via the wireless communication circuit 1008 (cf. FIG. 10).

According to various embodiments, the internal circuit 1012 may be further configured to perform an operation permission verification based on the received signal. According to various embodiments, the internal circuit 1012 may be configured to include at least one predefined identity of a permitted user of the electronic cigarette. According to various embodiments, the internal circuit 1012 may include a secure element configured to provide at least one cryptographic service.

According to various embodiments, a wireless communication circuit as described herein may be configured as at least one of an inductive coupling communication interface or capacitive coupling communication interface. According to various embodiments, a wireless communication circuit as described herein may be configured as a near field communication interface.

According to various embodiments, the wireless communication circuit 1008 disposed in and/or at the liquid container 1000 may further include or be a near field communication reader device.

According to various embodiments, an antenna and a passive NFC-chip or NFC-tag and, e.g. optionally, a secure-element (e.g. comparable to a secure-element of a smart-card) may be integrated into the electronic cigarette 100, e.g. as illustrated in FIG. 12, or directly in and/or on the liquid-cavity 1000, which is additionally for example pin-connected to the processor 110, e.g. as illustrated in FIG. 13. In these cases, the smartphone 1250, 1350 (which may include an NFC-reader-chip and an integrated secure element) communicates with the security-element inside of the electronic cigarette 100 or inside of the liquid container 1000 via NFC. The security-element inside of the electronic cigarette 100 or inside of the liquid container 1000 is connected to the processor 110 (e.g. a low-power microcontroller) of the electronic cigarette 100 starting the ignition accordingly.

The smartphone may have an integrated secure element (as may be used also for other purposes, e.g. for secure payment, etc.), the user and age-information is securely signed and stored in the secure element of the smartphone. For the age-verification the counterpart secure element inside of the electronic cigarette 100 or liquid container 1000 is able to read the user/age-data from the secure-element inside the smartphone via NFC and check the correctness of the signature. If all secured checks are positive, then the secure-element (e.g. the verification circuit) connected to the ignition-electronics (e.g. included in the processor 110 of the electronic cigarette 100) starts the ignition.

After tapping the smartphone to the electronic cigarette 100, the secure element integrated in the electronic cigarette 100 or in the liquid container 1000 communicates with the smartphone via NFC. The integrated secure element may read the user-data from the secure-element of the smartphone and check the correctness and/or signature and finally starts the ignition.

According to various embodiments, a liquid cavity 1000 (also referred to as liquid container 1000) may have a passive NFC-chip 1312 (cf. FIG. 13) and optionally a secure element integrate into the liquid cavity 1000. The passive NFC-chip 1312 and/or the secure element may be connected to a processor 110 of an electronic cigarette 100 (e.g. wire-based 1018), when the liquid cavity 1000 is inserted into the electronic cigarette 100. In this case, additional authenticity attestation of liquid is possible. A smartphone 1350 may be a reader for the passive NFC-chip 1312 and may perform age and/or liquid authentication check.

If more security is desired, a secure element for authenticity is provided, wherein in this case every liquid container 1000 may have an individual passive NFC-chip.

In case of using a passive NFC-chip, cf. FIGS. 12 and 13, the electronic cigarette 100 may be configured so that the energy is provided via NFC from the communication device 1250, 1350; therefore, the energy of the electronic cigarette battery 414 will not be consumed.

A passive NFC-chip may be smaller and cheaper than an active NFC-reader component. If the passive internal circuit 1312 (including for example passive NFC-chip, passive secure-element chip, and a miniaturized antenna) is mounted on and/or in the liquid-cavity 1000, a smartphone-app (e.g. as secure-element) may be able to communicate with the liquid-cavity 1000 and therefore also check and attest the authenticity of the liquid-cavity 1000. This might be of high interest, if there would be pirated copies of such liquids on the market. Using a smartphone as NFC-reader 1250, 1350, the bill-of-material will be reduced significantly, since the passive NFC-components 1212, 1312 (on electronic cigarette side or on liquid-cavity side) are usually smaller and cheaper than active NFC-reader components.

In Example 1 is an electronic cigarette including: a heater configured to vaporize a liquid; a mouth piece to deliver the vaporized liquid to a user of the electronic cigarette; a processor configured to control the heater to vaporize the liquid; a wireless communication circuit configured to communicate with an external communication device; and a verification circuit configured to start the operation of the electronic cigarette upon receipt of a signal transmitted by the external communication device via the wireless communication circuit.

In Example 2, the subject matter of Example 1 can optionally include that the verification circuit is configured to perform an operation permission verification based on the received signal.

In Example 3, the subject matter of Example 1 or 2 can optionally include that the verification circuit includes a secure element configured to provide at least one cryptographic service.

In Example 4, the subject matter of Examples 1 to 3 can optionally include that the wireless communication circuit is configured as at least one of an inductive coupling communication circuit or capacitive coupling communication circuit.

In Example 5, the subject matter of Example 4 can optionally include that the wireless communication circuit is configured as a near field communication circuit.

In Example 6, the subject matter of Example 5 can optionally include that the wireless communication circuit further includes a near field communication reader device.

In Example 7, the subject matter of Example 4 can optionally include that the wireless communication circuit further includes or is configured as a Bluetooth or Bluetooth-Low-Energy communication circuit.

In Example 8, the subject matter of Examples 1 to 7 can optionally include that the verification circuit is configured to include at least one predefined identity of a permitted user of the electronic cigarette.

In Example 9, the subject matter of Examples 1 to 8 can optionally further include a container containing the liquid. The wireless communication circuit can be disposed at least one of in and on the container.

In Example 10, the subject matter of Example 9 can optionally include that the liquid contains nicotine.

In Example 11, the subject matter of Examples 1 to 10 can optionally further include a battery to power at least one of the processor or the verification circuit.

In Example 12, the subject matter of Examples 1 to 11 can optionally include that the verification circuit is implemented in the processor.

In Example 13, the subject matter of Examples 1 to 12 can optionally further include a light source coupled to the processor. The processor can be configured to control the light source to indicate the operation of the electronic cigarette.

In Example 14, the subject matter of Examples 1 to 13 can optionally further include a sensor coupled to the processor and configured to determine the use of the electronic cigarette by the user.

In Example 15, the subject matter of Examples 1 to 14 can optionally further include a booster antenna structure coupled to the wireless communication circuit.

In Example 16, the subject matter of Example 15 can optionally include that the booster antenna structure includes a ferrite antenna.

Example 17 is an electronic cigarette arrangement including: an electronic cigarette; the electronic cigarette including: a heater configured to vaporize a liquid; a mouth piece to deliver the vaporized liquid to a user of the electronic cigarette; a processor configured to control the heater to vaporize the liquid; a wireless communication interface configured to communicate with a communication device; and a verification circuit configured to start the operation of the electronic cigarette upon receipt of a signal transmitted by the communication device via the wireless communication interface; the electronic cigarette arrangement including the communication device coupled to the electronic cigarette via the wireless communication interface.

In Example 18, the subject matter of Example 17 can optionally include that the communication device includes operation permission information about a user of the electronic cigarette.

In Example 19, the subject matter of Example 18 can optionally include that the operation permission information includes age information about the user of the electronic cigarette.

In Example 20, the subject matter of Examples 17 to 19 can optionally include that the communication device is a mobile communication device.

In Example 21, the subject matter of Examples 17 to 20 can optionally include that the communication device includes or is configured as a Bluetooth or Bluetooth-Low-Energy communication device.

In Example 22, the subject matter of Examples 17 to 21 can optionally include that the communication device includes a near field communication reader device.

In Example 23, the subject matter of Examples 17 to 19 can optionally include that the communication device is a contactless chip card.

In Example 24, the subject matter of Examples 17 to 23 can optionally include that the communication device is configured to perform operation permission verification and to generate the signal based on the verification result.

In Example 25, the subject matter of Examples 17 to 24 can optionally include that the communication device includes a secure element configured to provide at least one cryptographic service.

Example 26 is a method of operating an electronic cigarette, the method including: receiving a signal transmitted by an external communication device via a wireless communication circuit of the electronic cigarette; and starting the operation of the electronic cigarette based on the received signal.

Example 27 is a liquid container for an electronic cigarette, the liquid container including: a wireless communication circuit configured to communicate with an external communication device; a wire-based communication circuit configured to communicate with a processor of the electronic cigarette; and a verification circuit configured to communicate with a processor of the electronic cigarette via the wire-based communication circuit to start the operation of the electronic cigarette upon receipt of a signal transmitted by the external communication device via the wireless communication circuit.

In Example 28, the subject matter of Example 27 can optionally include that the verification circuit is configured to perform an operation permission verification based on the received signal.

In Example 29, the subject matter of Example 27 or 28 can optionally include that the verification circuit includes a secure element configured to provide at least one cryptographic service.

In Example 30, the subject matter of Examples 27 to 29 can optionally include that the wireless communication circuit is configured as at least one of an inductive coupling communication interface or capacitive coupling communication interface.

In Example 31, the subject matter of Example 30 can optionally include that the wireless communication circuit is configured as a near field communication interface.

In Example 32, the subject matter of Example 30 can optionally include that the wireless communication circuit includes or is configured as a Bluetooth or Bluetooth-Low-Energy communication interface.

In Example 33, the subject matter of Example 31 can optionally include that the wireless communication circuit further includes a near field communication reader device.

In Example 34, the subject matter of Examples 27 to 33 can optionally include that the verification circuit is configured to include at least one predefined identity of a permitted user of the electronic cigarette.

In Example 35, the subject matter of Examples 27 to 34 can optionally further include a liquid within the liquid container.

In Example 36, the subject matter of Example 35 can optionally include that the liquid contains nicotine.

In Example 37, the subject matter of Examples 27 to 36 can optionally further include a booster antenna structure coupled to the wireless communication circuit.

In Example 38, the subject matter of Example 37 can optionally include that the booster antenna structure includes a ferrite antenna.

In Example 39, the subject matter of Examples 27 to 38 can optionally include that the verification circuit is further configured to provide authenticity-information of a liquid in the liquid container via the wireless communication circuit to the external communication device.

Example 40 is an electronic cigarette arrangement including an electronic cigarette, the electronic cigarette including: a heater configured to vaporize a liquid disposed within a liquid container; a mouth piece to deliver the vaporized liquid to a user of the electronic cigarette; and a processor configured to control the heater to vaporize the liquid; an external communication device; the electronic cigarette arrangement further including the liquid container, wherein the liquid container includes: a wireless communication circuit configured to communicate with the external communication device; a wire-based communication circuit configured to communicate with the processor of the electronic cigarette; and a verification circuit configured to communicate with the processor of the electronic cigarette via the wire-based communication circuit to start the operation of the electronic cigarette upon receipt of a signal transmitted by the external communication device via the wireless communication circuit.

Example 41 is a liquid container for an electronic cigarette, the liquid container including: a wireless communication circuit configured to communicate with an external circuit; and an internal circuit configured to provide authenticity-information of a liquid in the liquid container via the wireless communication circuit to the external circuit.

In Example 42, the subject matter of Example 41 can optionally include that the external circuit is an external communication device.

In Example 43, the subject matter of Example 42 can optionally include that the internal circuit is further configured to communicate with a processor of the electronic cigarette to start the operation of the electronic cigarette upon receipt of a signal transmitted by the external communication device via the wireless communication circuit.

In Example 44, the subject matter of Example 43 can optionally include that the internal circuit is further configured to perform an operation permission verification based on the received signal.

In Example 45, the subject matter of Example 43 or 44 can optionally include that the internal circuit is configured to include at least one predefined identity of a permitted user of the electronic cigarette.

In Example 46, the subject matter of Examples 41 to 45 can optionally include that the internal circuit includes a secure element configured to provide at least one cryptographic service.

In Example 47, the subject matter of Examples 41 to 46 can optionally include that the wireless communication circuit is configured as at least one of an inductive coupling communication interface or capacitive coupling communication interface.

In Example 48, the subject matter of Example 47 can optionally include that the wireless communication circuit is configured as a near field communication interface.

In Example 49, the subject matter of Example 48 can optionally include that the wireless communication circuit further includes a near field communication reader device.

In Example 50, the subject matter of Example 47 can optionally include that the wireless communication circuit includes or is configured as a Bluetooth or Bluetooth-Low-Energy communication interface.

In Example 51, the subject matter of Examples 41 to 50 can optionally further include a liquid within the liquid container.

In Example 52, the subject matter of Example 51 can optionally include that the liquid contains nicotine.

In Example 53, the subject matter of Examples 41 to 52 can optionally further include a booster antenna structure coupled to the wireless communication circuit.

In Example 54, the subject matter of Example 53 can optionally include that the booster antenna structure includes a ferrite antenna.

Example 55 is an electronic cigarette, including: a heater configured to vaporize a liquid; a mouth piece to deliver the vaporized liquid to a user of the electronic cigarette; a processor configured to control the heater to vaporize the liquid; and a liquid container according to any one of Examples 27-39 and 41-50.

Example 56 is method of operating an electronic cigarette, the method including: receiving a signal transmitted by an external communication device via a wireless communication circuit of a liquid container for the electronic cigarette; and starting the operation of the electronic cigarette based on the received signal.

Example 57 is a method of operating an electronic cigarette, the method including: transmitting a signal by a wireless communication circuit of a liquid container to a verification circuit, the signal representing authenticity-information of the liquid container; and starting the operation of the electronic cigarette based on the received signal via the verification circuit.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. An electronic cigarette, comprising:
a heater configured to vaporize a liquid;
a mouth piece to deliver the vaporized liquid to a user of the electronic cigarette;
a processor configured to control the heater to vaporize the liquid;
a wireless communication circuit comprising an active inductive communication reader-chip configured to interrogate a passive external communication device via an inductive coupling communication or a capacitive coupling communication, and to receive from the interrogation an operation permission information; and
a verification circuit configured to switch from a first operational mode to a second operational mode according to the operation permission information, wherein the first operational mode precludes operation of the electronic cigarette, and the second operational mode permits operation of the electronic cigarette,
wherein the active inductive communication reader-chip is configured to generate an electromagnetic field to perform a read-out operation of the passive external communication device.

2. The electronic cigarette of claim 1,
wherein the operation permission information comprises a birthdate or age.

3. The electronic cigarette of claim 1,
wherein the wireless communication circuit is configured as a Near Field Communication circuit.

4. The electronic cigarette of claim 1,
wherein the operation permission information comprises a user identity, and the verification circuit is configured to correlate the user identity to at least one predefined identity of a permitted user of the electronic cigarette.

5. An electronic cigarette arrangement, comprising:
an electronic cigarette, comprising:
a heater configured to vaporize a liquid;
a mouth piece to deliver the vaporized liquid to a user of the electronic cigarette;
a processor configured to control the heater to vaporize the liquid;
a wireless communication interface, comprising an active inductive communication reader-chip, configured to interrogate a passive external communication device via an inductive coupling communication or a capacitive coupling communication, and to receive from the interrogation an operation permission information; and
a verification circuit configured to switch from a first operational mode to a second operational mode according to the operation permission information, wherein the first operational mode precludes operation of the electronic cigarette, and the second operational mode permits operation of the electronic cigarette; and
the external communication device coupled to the electronic cigarette via the wireless communication interface,
wherein the active inductive communication reader-chip is configured to generate an electromagnetic field to perform a read-out operation of the passive external communication device.

6. The electronic cigarette arrangement of claim 5,
wherein the communication device comprises an operation permission information about a user of the electronic cigarette.

7. The electronic cigarette arrangement of claim 6,
wherein the operation permission information comprises age information about the user of the electronic cigarette.

8. The electronic cigarette arrangement of claim 5,
wherein the communication device is a mobile communication device.

9. The electronic cigarette of claim 5,
wherein the communication device comprises or is configured as a Bluetooth or Bluetooth-Low-Energy communication device.

10. The electronic cigarette arrangement of claim 5,
wherein the communication device comprises a Near Field Communication reader device.

11. The electronic cigarette arrangement of claim 5,
wherein the communication device is a contactless chip card.

12. The electronic cigarette arrangement of claim 5,
wherein the communication device is configured to perform operation permission verification and to generate the signal based on the verification result.

13. The electronic cigarette arrangement of claim 5,
wherein the communication device comprises a secure element configured to provide at least one cryptographic service.

14. An electric cigarette liquid container, said liquid container being configured to be removably mounted in an electronic cigarette,
the liquid container comprising:
a liquid for vaporizing;
a wireless communication circuit, located within the liquid container, configured to communicate with an external communication device;
a wire-based communication circuit, located within the liquid container, configured to communicate with a processor of an electronic cigarette; and
a verification circuit, located within the liquid container, configured to communicate with the processor of the electronic cigarette via the wire-based communication circuit to start the operation of the electronic cigarette upon receipt of a signal transmitted by the external communication device via the wireless communication circuit.

15. The liquid container of claim 14,
wherein the verification circuit is configured to perform an operation permission verification based on the received signal.

16. The liquid container of claim 14,
wherein the verification circuit comprises a secure element configured to provide at least one cryptographic service.

17. The liquid container of claim 14,
wherein the wireless communication circuit is configured as at least one of an inductive coupling communication interface or capacitive coupling communication interface.

18. The electronic cigarette of claim 1, wherein the verification circuit is further configured to switch from the second operational mode to the first operational mode upon the elapse of a predefined duration following receipt of the operation permission information.

19. The electronic cigarette of claim 1, wherein the verification circuit is configured to operate according to the first operational mode by disabling the heater and to operate according to the second operational mode by enabling the heater.

20. The electronic cigarette of claim 1, wherein the external communication device is a bank card, an electronic cash card, a credit card, or a passport.

* * * * *